US012583960B2

(12) United States Patent
Saito

(10) Patent No.: US 12,583,960 B2
(45) **Date of Patent: *Mar. 24, 2026**

(54) ACRYLIC ELASTOMER COPOLYMER AND CROSSLINKABLE COMPOSITION THEREOF

(71) Applicant: UNIMATEC CO., LTD., Tokyo (JP)

(72) Inventor: Satoru Saito, Ibaraki (JP)

(73) Assignee: UNIMATEC CO., LTD., Tokyo (JP)

( * ) Notice: Subject to any disclaimer, the term of this patent is extended or adjusted under 35 U.S.C. 154(b) by 525 days.

This patent is subject to a terminal disclaimer.

(21) Appl. No.: 18/023,832

(22) PCT Filed: Aug. 2, 2021

(86) PCT No.: PCT/JP2021/028569

§ 371 (c)(1),
(2) Date: Feb. 28, 2023

(87) PCT Pub. No.: WO2022/049958

PCT Pub. Date: Mar. 10, 2022

(65) Prior Publication Data

US 2023/0322988 A1 Oct. 12, 2023

(30) Foreign Application Priority Data

Sep. 2, 2020 (JP) ................................ 2020-147326

(51) Int. Cl.

| | |
|---|---|
| ***C08F 220/18*** | (2006.01) |
| ***C08F 220/06*** | (2006.01) |
| ***C08F 220/26*** | (2006.01) |
| ***C08F 220/36*** | (2006.01) |
| ***C08K 5/00*** | (2006.01) |
| ***C08L 33/08*** | (2006.01) |

(52) U.S. Cl.

CPC .......... *C08F 220/36* (2013.01); *C08F 220/06* (2013.01); *C08F 220/26* (2013.01); *C08K 5/0025* (2013.01); *C08L 33/08* (2013.01); *C08L 2312/00* (2013.01)

(58) Field of Classification Search

CPC ...... C08F 220/36; C08F 220/06; C08L 33/08; C08L 33/14

See application file for complete search history.

(56) References Cited

U.S. PATENT DOCUMENTS

| | | | | |
|---|---|---|---|---|
| 5,134,200 | A | 7/1992 | Wideman | |
| 6,093,853 | A | 7/2000 | Nakagome et al. | |
| 6,329,551 | B1 | 12/2001 | Nakagome et al. | |
| 8,288,483 | B2 | 10/2012 | Ito et al. | |
| 8,609,753 | B2 | 12/2013 | Ogawa et al. | |
| 8,937,121 | B2 | 1/2015 | Sakamoto et al. | |
| 2002/0016508 | A1 | 2/2002 | Nakagome et al. | |
| 2005/0159519 | A1 | 7/2005 | Nakagome et al. | |
| 2005/0165191 | A1* | 7/2005 | Kobayashi ............ | C08F 220/12 526/319 |
| 2008/0071014 | A1 | 3/2008 | Ohishi et al. | |
| 2011/0040043 | A1 | 2/2011 | Ito et al. | |
| 2011/0301300 | A1* | 12/2011 | Iizuka ..................... | C08C 19/02 525/379 |
| 2012/0302674 | A1 | 11/2012 | Ogawa et al. | |
| 2012/0302675 | A1 | 11/2012 | Sakamoto et al. | |
| 2015/0087754 | A1 | 3/2015 | Sakamoto et al. | |

FOREIGN PATENT DOCUMENTS

| | | | | |
|---|---|---|---|---|
| EP | 0 556 727 | A1 | 8/1993 | |
| EP | 2053089 | B1 * | 10/2011 | ........... C08K 5/0025 |
| JP | 04-264106 | A | 9/1992 | |
| JP | 05-230132 | A | 9/1993 | |
| JP | 11-021411 | A | 1/1999 | |
| JP | 2002-265531 | A | 9/2002 | |
| JP | 2006-274111 | A | 10/2006 | |

(Continued)

OTHER PUBLICATIONS

Machine translation into English of JP-2009036960-A (Year: 2009).*
Hor Vath, "High Performance Nitrile Rubber Automotive Fuel Hose", Rubber Division, American Chemical Society, vol. 52, 1979, pp. 883-894.
Igarashi et al., "Novel Water-developable Photoimaging Materials Consisting of Base-amplifying Polymers and a Photobase Generator", Material Technology, vol. 25, No. 6, 2007, pp. 285-293.
Igarashi et al., "Water-developable Base-amplifying Copolymers", Journal of Photopolymer Science & Technology, vol. 18, No. 3, 2005, pp. 419-420.
Meyer et al., "Emulsion Rubbers Copolymerized With Monomeric Antioxidants", Rubber Division, American Chemical Society, vol. 46, 1973, pp. 106-114.

(Continued)

*Primary Examiner* — Karuna P Reddy

(74) *Attorney, Agent, or Firm* — Greenblum & Bernstein, P.L.C.

(57) ABSTRACT

An acrylic elastomer copolymer that is a copolymer of (A) an alkyl (meth)acrylate and/or alkoxyalkyl (meth)acrylate monomer, (B) an α,β-unsaturated carboxylic acid monomer, and (C) a (meth)acrylate monomer having a carbamic acid ester group represented by the general formula:

(I)

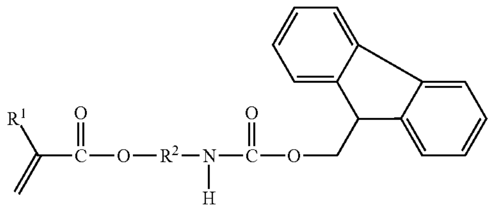

(wherein $R^1$ is a hydrogen atom or a methyl group, and $R^2$ is a divalent aliphatic hydrocarbon group having 1 to 10 carbon atoms). A crosslinkable composition in which a crosslinking accelerator is compounded with the acrylic elastomer copolymer.

2 Claims, 5 Drawing Sheets

(56) References Cited

FOREIGN PATENT DOCUMENTS

| | | | | |
|---|---|---|---|---|
| JP | 2009036960 | A | * | 2/2009 |
| JP | 2009-209268 | A | | 9/2009 |
| JP | 2010-235955 | A | | 10/2010 |
| JP | 2010-254579 | A | | 11/2010 |
| JP | 2011-225645 | A | | 11/2011 |
| JP | 2015-227402 | A | | 12/2015 |
| WO | 2006/001299 | A1 | | 1/2006 |
| WO | 2009/096545 | A1 | | 8/2009 |
| WO | 2011/058918 | A1 | | 5/2011 |
| WO | 2011/093443 | A1 | | 8/2011 |

OTHER PUBLICATIONS

International Search Report and Written Opinion of the International Searching Authority issued in International Pat. Appl. No. PCT/JP2021/028569, dated Sep. 21, 2021, along with an English translation thereof.

International Preliminary Report on Patentability issued in International Pat. Appl. No. PCT/JP2021/028569, dated Mar. 7, 2023, along with an English translation thereof.

* cited by examiner

[Fig. 1]
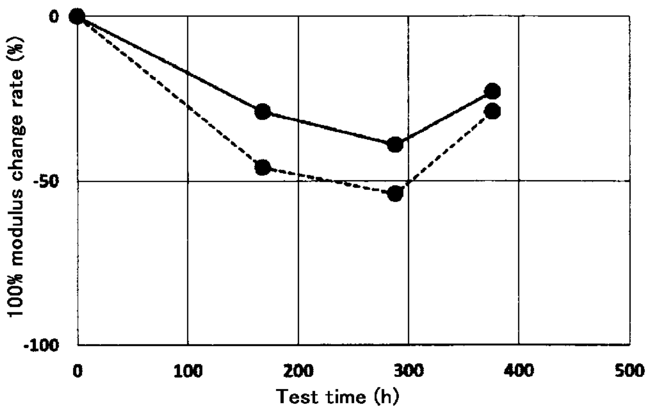
[Fig. 2]
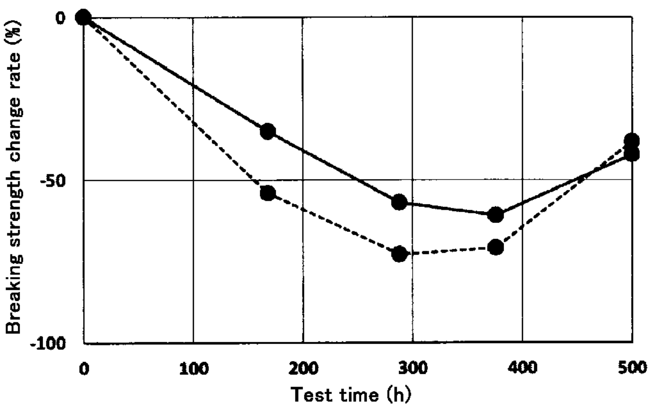
[Fig. 3]
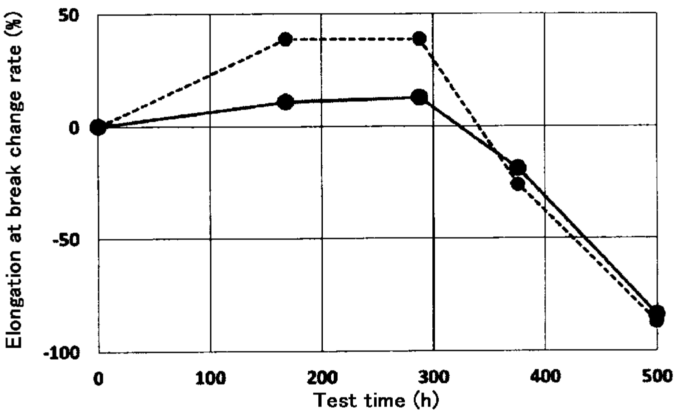

[Fig. 4]
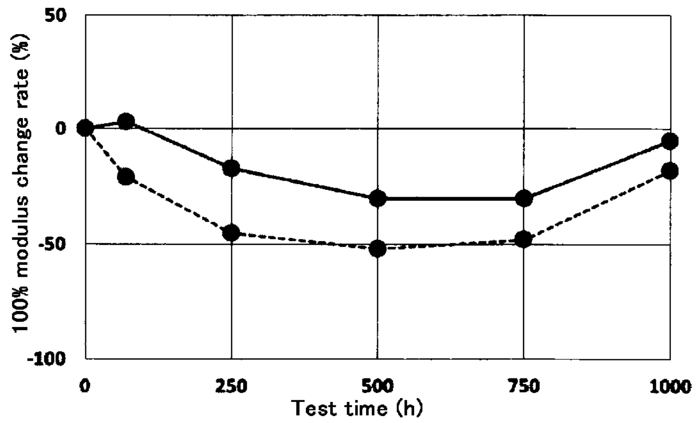
[Fig. 5]
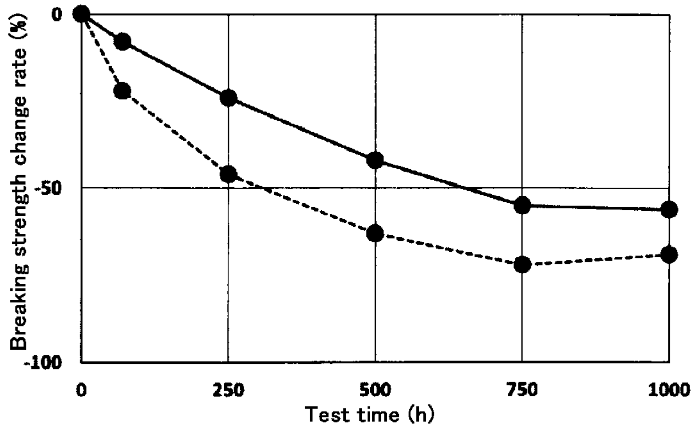
[Fig. 6]
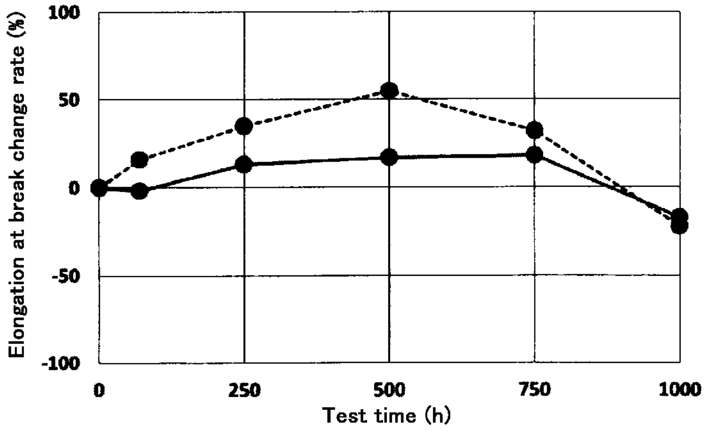

[Fig. 7]
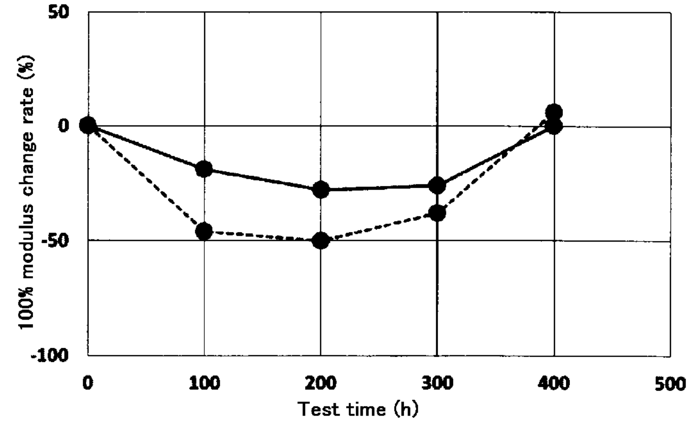
[Fig. 8]
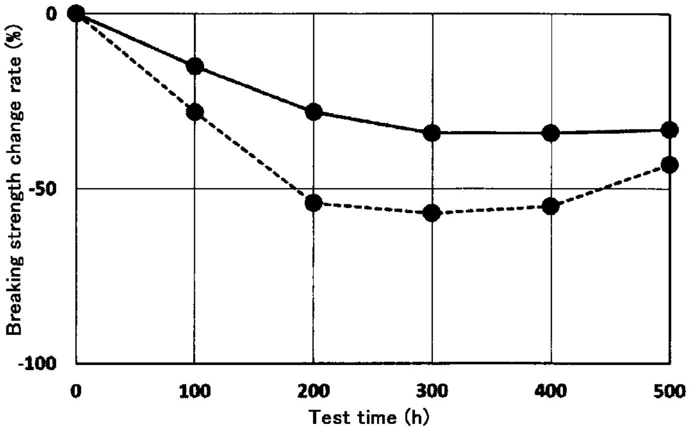
[Fig. 9]
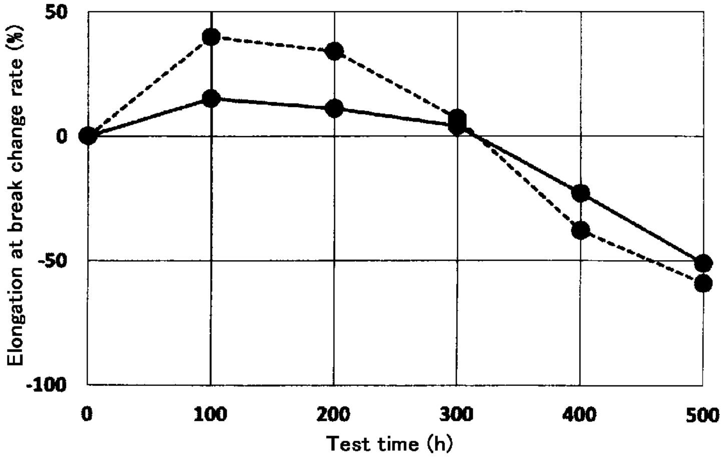

[Fig. 10]
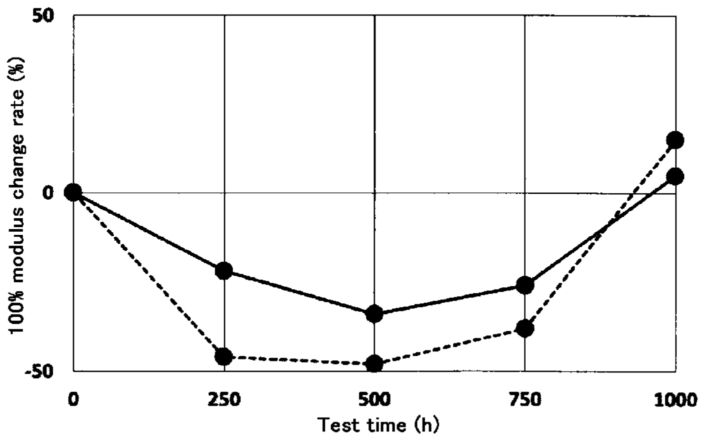
[Fig. 11]
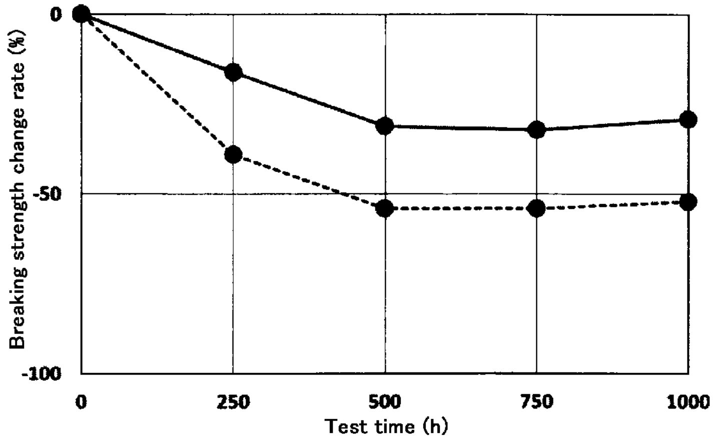
[Fig. 12]
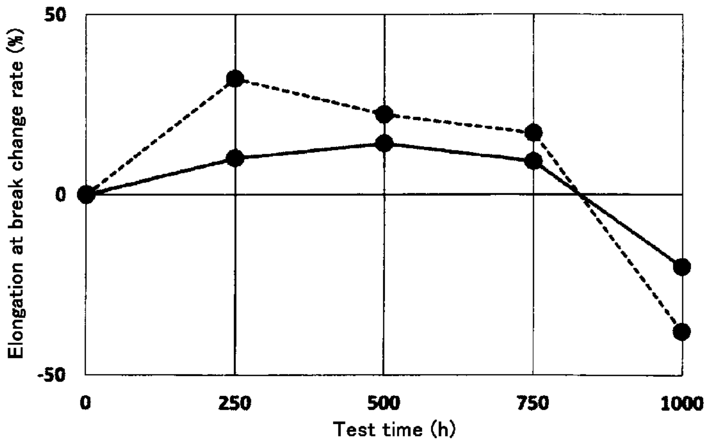

[Fig. 13]
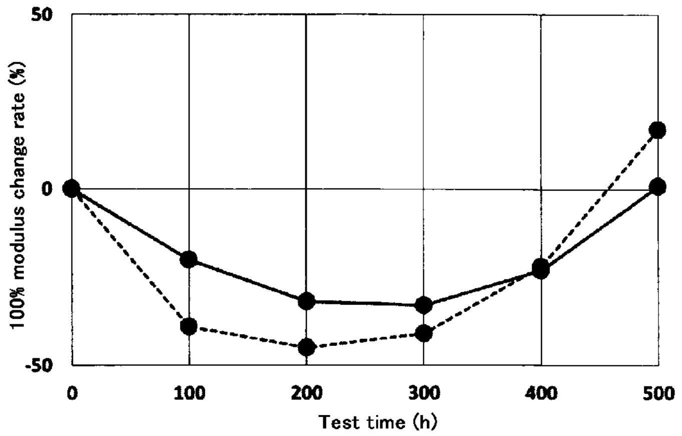
[Fig. 14]
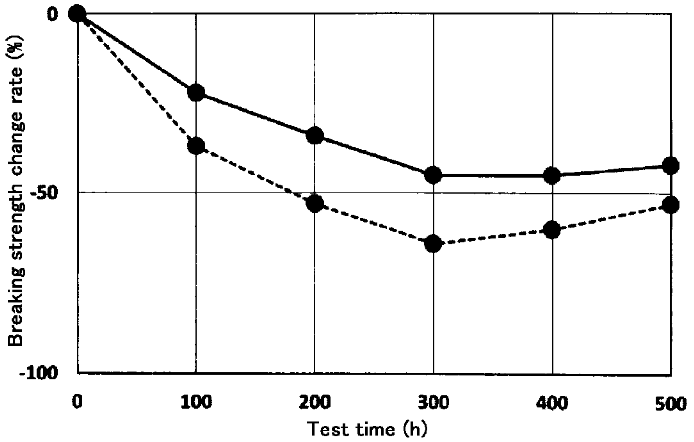
[Fig. 15]
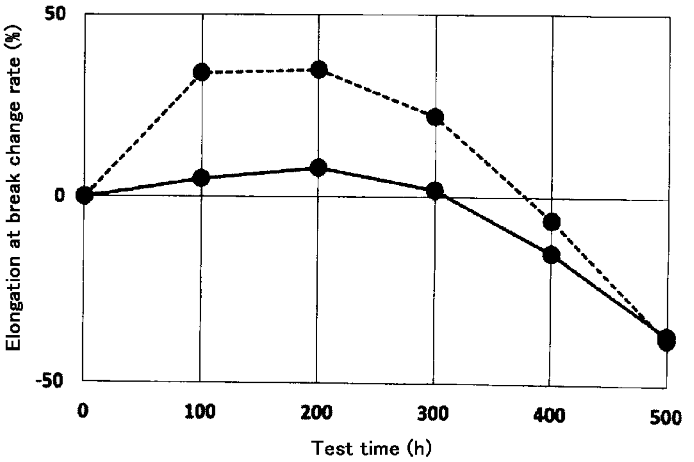

ACRYLIC ELASTOMER COPOLYMER AND CROSSLINKABLE COMPOSITION THEREOF

TECHNICAL FIELD

The present invention relates to an acrylic elastomer copolymer and a crosslinkable composition thereof. More particularly, the present invention relates to an acrylic elastomer copolymer in which a (meth)acrylate monomer having a carbamic acid ester group is copolymerized, and to a crosslinkable composition thereof.

BACKGROUND ART

From the perspective of global climate change countermeasures and efficient use of energy, emission regulations for carbon dioxide and NOx gases emitted from internal combustion engines, typified by automobile engines, tend to be more stringent. As a countermeasure thereof, automobile engines are required to have higher output, higher thermal efficiency, and lower and harmless emissions. This tends to increase the temperature in the engine compartment. Along with this trend, polymer materials, such as rubber and plastic, used in the surrounding area are required to have further improved heat resistance.

As specific examples, vehicles equipped with a turbocharger system for the purpose of improving the fuel efficiency of the engine are becoming widespread. Since air guided from the turbocharger to the intercooler and engine has high temperature and high pressure, high heat resistance is required for rubber hose materials that transport the air.

Thus, with the demand for higher temperatures and longer life for polymer materials used in automobile engines, as countermeasures thereof, efforts are being made to improve the heat resistance of the raw material rubber itself of rubber product parts, and appropriate antioxidants are being added to rubber product parts.

For example, as an effort to improve the heat resistance of the acrylic rubber itself, the crosslinking site monomer is changed from an active chlorine-containing unsaturated monomer to an α,β-unsaturated carboxylic acid monomer, thereby forming a strong crosslinking structure that can withstand use in high temperature environments.

Further, phenol-based antioxidants and amine-based antioxidants are used as typical antioxidants for improving the heat resistant life of rubber members. In particular, amine-based antioxidants are used for rubber members used in higher temperature environments.

For example, in the case of acrylic rubber, amine-based antioxidants typified by 4,4'-bis(α,α-dimethylbenzyl)diphenylamine are used as antioxidants (Patent Documents 1 to 4). However, even these amine-based antioxidants cannot fully satisfy the recent heat resistance requirements.

In recent years, phenothiazine-based antioxidants are said to be effective as antioxidants for rubber materials. As a rubber material that has excellent vulcanization characteristics, mechanical characteristics, and heat aging characteristics, and that is particularly suitable for use in anti-vibration rubber, Patent Document 5 discloses one comprising (A) a diene-based rubber, (B) a bismaleimide compound, and (C) the following phenothiazine compound:

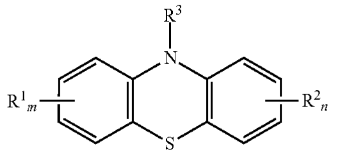

$R^1$, $R^2$: a hydrogen atom, a $C_1$-$C_8$ alkyl group that may be substituted with an aromatic ring, an alkoxy group, a halogen atom, or a cyano group $R^3$: a hydrogen atom, a $C_1$-$C_6$ chain or cyclic alkyl group, a vinyl group, or an aromatic group m, n: 0 to 2

A phenothiazine compound in which the sulfur atom at position 5 is $—SO_2—$ is also known and described, for example, in Patent Document 6.

Patent Document 6 discloses a condensed heterocyclic compound represented by the following general formula and an organic material composition comprising the same, and states that it is possible to impart high processing stability, heat resistance, and long life to organic materials such as polymer that is susceptible to oxidative, thermal, or photo-induced breakdown.

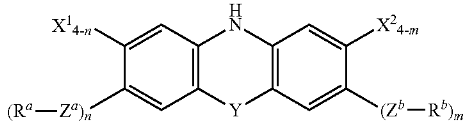

Y: a chemical single bond, —S(═O)—, or $—SO_2—$ $R^a$, $R^b$: a $C_1$-$C_{30}$ organic group that may have a substituent $Z^a$, $Z^b$: a chemical single bond or $—SO_2—$ $X^1$, $X^2$: a hydrogen atom, a halogen atom, an alkyl group, a cyano group, a nitro group, $—OR^1$, $—O—CO—R^1$, $—CO—OR^1$, $—O—CO—OR^1$, $—NR^2R^3$, $—NR^2—CO—R^1$, $—CO—NR^2R^3$, or $—O—CO—NR^2R^3$ n, m: 0 to 2, provided that one of them is not 0.

Moreover, in order to prevent the volatilization of amine-based antioxidants form rubber members, studies have been made on increasing the molecular weight and melting point of amine-based antioxidants. However, along with the increase in the molecular weight and melting point of antioxidants, there are problems such as reducing dispersibility in rubber and transferability inside rubber.

Further, for the purpose of preventing the volatilization of antioxidants and extending the life of rubber parts in high temperature environments, a method of copolymerizing raw material rubber with an antioxidant having a polymerizable unsaturated group has also been examined (Patent Document 7).

Examples of such antioxidants include antioxidants having a polymerizable unsaturated group, such as Nocrac G-1 (produced by Ouchi Shinko Chemical Industrial Co., Ltd.) and APMA (produced by Seiko Chemical Co., Ltd.) (Non-Patent Documents 1 and 2).

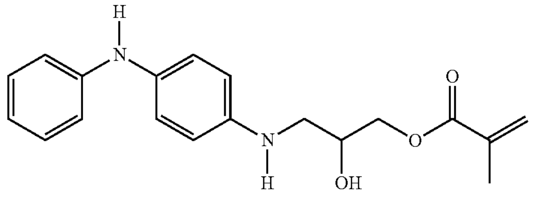

Nocrac G-1

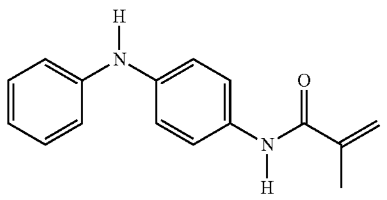

APMA

However, with the above antioxidants, radical copolymerization with a polymerizable unsaturated monomer is practically difficult due to the radical polymerization inhibitory effect of the diphenylamino group.

In contrast, several methods are disclosed for introducing a diphenylamino structure into a polymer by the modification reaction of elastomeric polymer. For example, the following methods are known: a method in which a diphenylamino group is introduced after hydroformylation of the side chain of an elastomer having an olefine-based unsaturated group (Patent Document 8), and a method in which a diphenylamino group is introduced after maleic anhydride is added to a diene-based copolymer in the presence of a free radical generator (Patent Document 9). However, these methods further require a modification step of introducing a diphenylamino group after producing a base copolymer, which is not practical in terms of production cost.

Thus, none of the methods of improvement in the heat resistance of the raw material rubber itself, improvement in the performance of various antioxidants, and chemical bonding of thermal antioxidant components to the raw material rubber can fully satisfy the recent heat resistance requirements.

PRIOR ART DOCUMENT

Patent Document

Patent Document 1: JP-A-11-21411
Patent Document 2: WO 2011/58918 A1
Patent Document 3: JP-A-2010-254579
Patent Document 4: WO 2006/001299 A1
Patent Document 5: JP-A-2015-227402
Patent Document 6: WO 2011/093443 A1
Patent Document 7: JP-A-2009-209268
Patent Document 8: JP-A-4-264106
Patent Document 9: JP-A-5-230132
Patent Document 10: JP-A-2009-036960
Patent Document 11: JP-A-2010-235955

Non-Patent Documents

Non-Patent Document 1: Rubber Chem. Technol., Vol. 46, pp. 106 (1973)
Non-Patent Document 2: Rubber Chem. Technol., Vol. 52, pp. 883 (1979)
Non-Patent Document 3: Journal of Photopolymer Science and Technology, Vol. 18, Number 3, pp. 419 (2005)
Non-Patent Document 4: Material Technology, Vol. 25, Number 6, pp. 285 (2007)

OUTLINE OF THE INVENTION

Problem to be Solved by the Invention

An object of the present invention is to provide an acrylic elastomer copolymer that can improve the heat resistance of a crosslinked product without particularly using a crosslinking agent, and to provide a crosslinkable composition thereof.

Means for Solving the Problem

The present invention is achieved by an acrylic elastomer copolymer that is a copolymer of (A) an alkyl (meth)acrylate and/or alkoxyalkyl (meth)acrylate monomer, (B) an α,β-unsaturated carboxylic acid monomer, and (C) a (meth) acrylate monomer having a carbamic acid ester group represented by the general formula:

(I)

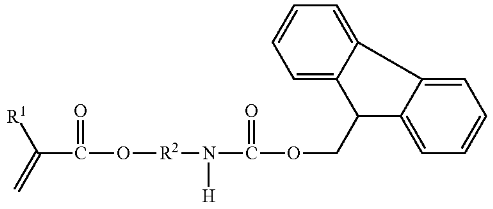

(wherein $R^1$ is a hydrogen atom or a methyl group, and $R^2$ is a divalent aliphatic hydrocarbon group having 1 to 10 carbon atoms).

The acrylic elastomer copolymer of the present invention is compounded with a crosslinking accelerator to thereby form a crosslinkable composition.

Effect of the Invention

According to the present invention, a (meth)acrylate monomer having a carbamic acid ester group represented by the general formula [I] is introduced into a carboxyl group-containing acrylic elastomer to thereby provide a self-completed crosslinkable acrylic elastomer copolymer without a particular need for a crosslinking agent. In such a crosslinking system, the carbamic acid ester moiety of the copolymerized (meth)acrylate monomer having a carbamic acid ester group is degraded by the action of heat and a base to release an amino group, and the released amino group reacts with the active site of the copolymerized α,β-unsaturated carboxylic acid monomer for crosslinking. In this crosslinking, it is considered that intramolecular crosslinking and intermolecular crosslinking are induced at the same time.

Since such an acrylic elastomer copolymer can improve the decrease in mechanical strength (softening deterioration) observed in the initial stage of thermal oxidative deterioration of crosslinked products, there is an excellent effect of improving the heat resistance of the acrylic elastomer copolymer.

Copolymers of the (meth)acrylate monomer having a carbamic acid ester group represented by the general formula [I] with a (meth)acrylate monomer, such as methyl acrylate or methyl methacrylate, are described in Patent Document 10 and Non-Patent Documents 3 and 4. These copolymers are aimed at forming image-forming layers of photosensitive planographic printing plate materials together with a photobase generator, but not at forming crosslinkable compositions together with a crosslinking accelerator.

Patent Document 11 indicates that a dicarbamic acid ester compound $R^2(SO_2)_m(CH_2)_nOCONH—R^1—NHCOO(CH_2)_n(SO_2)_mR^2$ ($R^1$: a divalent aliphatic alkylene group, a divalent alicyclic cycloalkylene group, or a divalent aromatic group, $R^2$: a fluorenyl group-containing group, n: 0 to 2, and m: 0 to 1) can be used to crosslink acrylic rubber having a carboxyl group. However, none of the documents teaches nor suggests acrylic elastomer copolymers in which the (meth)acrylate monomer having a carbamic acid ester group represented by the general formula [I] is copolymerized with an alkyl (meth)acrylate and/or alkoxyalkyl (meth) acrylate monomer and an α,β-unsaturated carboxylic acid monomer to improve the heat resistance of acrylic rubber.

Since the acrylic elastomer copolymer can be crosslinked without the addition of an aromatic or aliphatic polyamine-based crosslinking agent in the production of crosslinkable compositions, the step of adding a crosslinking agent can be omitted, and the risk of poor distribution of the crosslinking agent in the acrylic elastomer copolymer can be eliminated.

Furthermore, crosslinkable compositions comprising the acrylic elastomer copolymer of the present invention as a main component are effective to be able to provide cross-linked products having sufficient mechanical strength by primary crosslinking.

BRIEF DESCRIPTION OF DRAWINGS

FIG. 1: a schematic diagram of the 100% modulus change rate of acrylic elastomer copolymer crosslinked products at 190° C. (solid line: Example 4, dashed line: Comparative Example 4).

FIG. 2: a schematic diagram of the breaking strength change rate of acrylic elastomer copolymer crosslinked products at 190° C. (solid line: Example 4, dashed line: Comparative Example 4).

FIG. 3: a schematic diagram of the elongation at break change rate of acrylic elastomer copolymer crosslinked products at 190° C. (solid line: Example 4, dashed line: Comparative Example 4).

FIG. 4: a schematic diagram of the 100% modulus change rate of acrylic elastomer copolymer crosslinked products at 175° C. (solid line: Example 4, dashed line: Comparative Example 4).

FIG. 5: a schematic diagram of the breaking strength change rate of acrylic elastomer copolymer crosslinked products at 175° C. (solid line: Example 4, dashed line: Comparative Example 4).

FIG. 6: a schematic diagram of the elongation at break change rate of acrylic elastomer copolymer crosslinked products at 175° C. (solid line: Example 4, dashed line: Comparative Example 4).

FIG. 7: a schematic diagram of the 100% modulus change rate of acrylic elastomer copolymer crosslinked products at 190° C. (solid line: Example 5, dashed line: Comparative Example 5).

FIG. 8: a schematic diagram of the breaking strength change rate of acrylic elastomer copolymer crosslinked products at 190° C. (solid line: Example 5, dashed line: Comparative Example 5).

FIG. 9: a schematic diagram of the elongation at break change rate of acrylic elastomer copolymer crosslinked products at 190° C. (solid line: Example 5, dashed line: Comparative Example 5).

FIG. 10: a schematic diagram of the 100% modulus change rate of acrylic elastomer copolymer crosslinked products at 175° C. (solid line: Example 5, dashed line: Comparative Example 5).

FIG. 11: a schematic diagram of the breaking strength change rate of acrylic elastomer copolymer crosslinked products at 175° C. (solid line: Example 5, dashed line: Comparative Example 5).

FIG. 12: a schematic diagram of the elongation at break change rate of acrylic elastomer copolymer crosslinked products at 175° C. (solid line: Example 5, dashed line: Comparative Example 5).

FIG. 13: a schematic diagram of the 100% modulus change rate of acrylic elastomer copolymer crosslinked products at 190° C. (solid line: Example 6, dashed line: Comparative Example 6).

FIG. 14: a schematic diagram of the breaking strength change rate of acrylic elastomer copolymer crosslinked products at 190° C. (solid line: Example 6, dashed line: Comparative Example 6).

FIG. 15: a schematic diagram of the elongation at break change rate of acrylic elastomer copolymer crosslinked products at 190° C. (solid line: Example 6, dashed line: Comparative Example 6).

EMBODIMENTS FOR CARRYING OUT THE INVENTION

The acrylic elastomer copolymer of the present invention comprises the following constituent monomers; (A) an alkyl (meth)acrylate monomer and/or an alkoxyalkyl (meth)acrylate monomer, (B) an α,β-unsaturated carboxylic acid monomer, and (C) a (meth)acrylate monomer having a carbamic acid ester group represented by the general formula [I]:

(I)

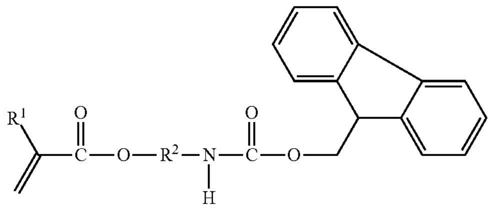

(wherein $R^1$ is a hydrogen atom or a methyl group, and $R^2$ is a divalent aliphatic hydrocarbon group having 1 to 10 carbon atoms).

These monomers are each copolymerized at the following ratio: 90 to 99.8 wt %, preferably 90 to 99 wt %, of the alkyl (meth)acrylate monomer and/or alkoxyalkyl (meth)acrylate monomer (A), 0.1 to 5 wt %, preferably 0.5 to 5 wt %, of the α,β-unsaturated carboxylic acid monomer (B), and 0.1 to 5 wt %, preferably 0.5 to 5 wt %, of the (meth)acrylate monomer (C) having a carbamic acid ester group represented by the general formula [I].

As the alkyl (meth)acrylate monomer and/or alkoxyalkyl (meth)acrylate monomer that constitutes the acrylic elastomer copolymer of the present invention, at least one (meth) acrylate selected from alkyl (meth)acrylates containing an alkyl group having 1 to 8 carbon atoms, aralkyl (meth)

acrylates containing an aralkyl group having 7 to 20 carbon atoms, and alkoxyalkyl (meth)acrylates containing an alkoxyalkyl group having 2 to 8 carbon atoms is used. Here, (meth)acrylate refers to acrylate or methacrylate.

Examples of alkyl (meth)acrylate include methyl (meth) acrylate, ethyl (meth)acrylate, propyl (meth)acrylate, isopropyl (meth)acrylate, n-butyl (meth)acrylate, n-hexyl (meth)acrylate, 2-ethylhexyl (meth)acrylate, n-octyl (meth) acrylate, cyclohexyl (meth)acrylate, and the like.

Examples of aralkyl (meth)acrylate include benzyl (meth) acrylate and the like.

Moreover, examples of alkoxyalkyl (meth)acrylate include methoxymethyl (meth)acrylate, methoxyethyl (meth)acrylate, ethoxyethyl (meth)acrylate, n-butoxyethyl (meth)acrylate, ethoxypropyl (meth)acrylate, methoxyethoxyethyl (meth)acrylate, ethoxyethoxyethyl (meth)acrylate and the like.

Although each of alkoxyalkyl acrylate and alkyl acrylate may be used singly, it is preferable that the former is used at a ratio of about 60 to 0 wt. %, and that the latter is used at a ratio of about 40 to 100 wt. %. When an alkoxyalkyl acrylate is copolymerized, oil resistance and cold resistance are well balanced. However, when the copolymerization ratio of alkoxyalkyl acrylate is greater than this range, normal state physical properties and heat resistance tend to decrease.

Examples of the α,β-unsaturated carboxylic acid monomer that constitutes the acrylic elastomer copolymer of the present invention include monobasic α,β-unsaturated carboxylic acids, dibasic α,β-unsaturated carboxylic acids, or dibasic α,β-unsaturated carboxylic acid monoalkyl esters.

Examples of monobasic α,β-unsaturated carboxylic acid include acrylic acid, methacrylic acid and the like.

Examples of dibasic α,β-unsaturated carboxylic acid include maleic acid, fumaric acid, itaconic acid, citraconic acid and the like.

Examples of dibasic α,β-unsaturated carboxylic acid monoalkyl ester include monoalkyl esters of maleic acid, fumaric acid, itaconic acid, and citraconic acid. Specific examples include monomethyl maleate, monoethyl maleate, mono n-propyl maleate, monoisopropyl maleate, mono n-butyl maleate, monoisobutyl maleate, mono n-hexyl maleate, monocyclohexyl maleate, monomethyl fumarate, monoethyl fumarate, mono n-propyl fumarate, monoisopropyl fumarate, mono n-butyl fumarate, monoisobutyl fumarate, mono n-hexyl fumarate, monocyclohexyl fumarate, and the like.

In the acrylic elastomer copolymer of the present invention, the α,β-unsaturated carboxylic acid monomer is copolymerized at a ratio of 0.1 to 5 wt %, preferably 0.5 to 5 wt %.

Specific examples of the (meth)acrylate monomer having a carbamic acid ester group represented by the general formula [I] that constitutes the acrylic elastomer copolymer of the present invention include the following:

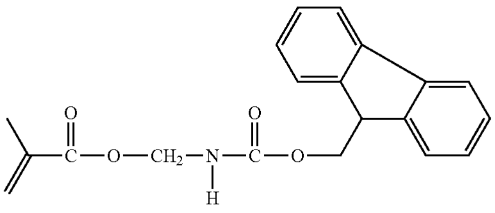

-continued

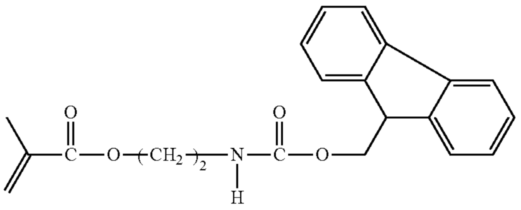

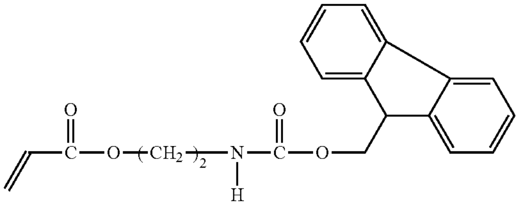

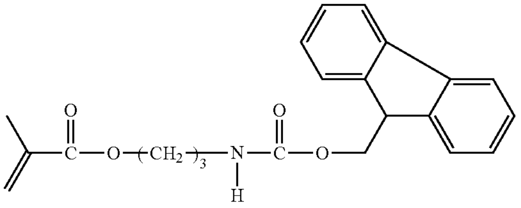

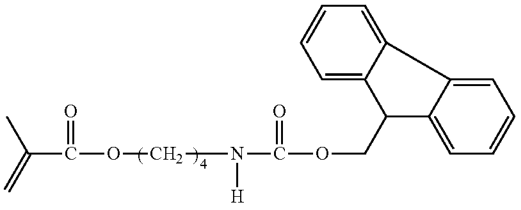

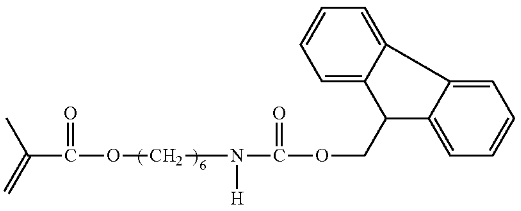

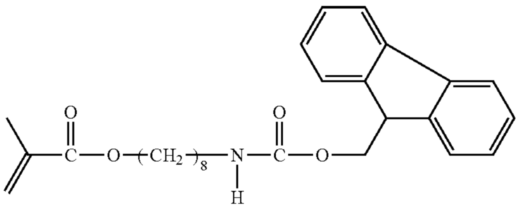

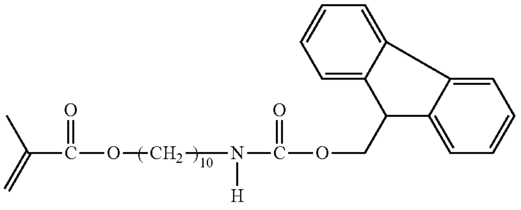

In terms of ease of production, the following monomer is preferably used:

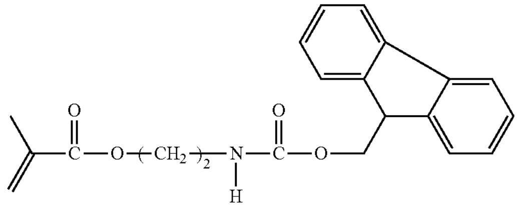

The (meth)acrylate monomer having a carbamic acid ester group represented by the general formula [I] can be easily produced by reacting isocyanatoalkyl acrylate or isocyanatoalkyl methacrylate with 9-fluorenylmethanol in the presence of a urethanization catalyst.

As the urethanization catalyst, an organic tin compound, an organic titanium compound, an organic zirconium compound, or an organic bismuth compound can be used. Examples of organic tin compounds include dibutyltin dilaurate, tin bis(2-ethylhexanoate), dibutyltin (2,4-pentanedionate), and the like. Examples of organic titanium compounds include titanium diisopropoxy bis(ethylacetoacetate) and the like. Examples of organic zirconium compounds include zirconium dibutoxybis(ethylacetate), zirconium tetra(acetylacetate), and the like. Examples of organic bismuth compounds include bismuth tris(neodecanoate) and the like.

The reaction is carried out in an organic solvent, such as benzene, toluene, dioxane, methyl ethyl ketone, or cyclohexane, at 40 to 80° C.

In the acrylic elastomer copolymer of the present invention, the (meth)acrylate monomer having a carbamic acid ester group represented by the general formula [I] is copolymerized at a ratio of about 0.1 to 5 wt %, preferably about 0.5 to 5 wt %. If the (meth)acrylate monomer having a carbamic acid ester group represented by the general formula [I] is copolymerized at a ratio greater than this range, crosslinking is excessive, and the elasticity of the crosslinked product may be reduced. In contrast, if the (meth) acrylate monomer is used at a ratio less than this range, crosslinking is insufficient, and the crosslinking rate and the mechanical strength of the crosslinked product tend to be reduced.

An approximate indication of the composition ratio of the (meth)acrylate monomer having a carbamic acid ester group represented by the general formula [I] and the α,β-unsaturated carboxylic acid monomer can be determined by W1/W2=M1/M2, but can be suitably adjusted in consideration of the crosslinking rate, the various physical properties of the crosslinked product, and other factors.

W1 (wt %): weight fraction composition of the (meth) acrylate monomer having a carbamic acid ester group W2 (wt %): weight fraction composition of the α,β-unsaturated carboxylic acid monomer M1 (g/mol): molecular weight of the (meth)acrylate monomer having a carbamic acid ester group M2 (g/mol): molecular weight of the α,β-unsaturated carboxylic acid monomer However, when a blend of the acrylic elastomer copolymer of the present invention and a general carboxyl group-containing acrylic elastomer is used for crosslinking, or when a polyvalent amine crosslinking agent is newly added to the acrylic elastomer copolymer of the present invention, the W1/W2 ratio is not limited to the above formula and is suitably adjusted depending on each case.

Moreover, in addition to these main components of the acrylic elastomer copolymer of the present invention, other polymerizable unsaturated monomers can be used, if necessary.

Examples of polymerizable unsaturated monomer include styrene, α-methylstyrene, 3-methylstyrene, 4-methylstyrene, 1-vinylnaphthalene, 2-vinylnaphthalene, acrylonitrile, methacrylonitrile, acrylic acid amide, vinyl acetate, methyl vinyl ether, ethyl vinyl ether, ethylene, propylene, piperylene, butadiene, isoprene, chloroprene, cyclopentadiene, vinyl chloride, vinylidene chloride, and the like.

The acrylic elastomer copolymer of the present invention is produced by a general method for polymerizing acrylic rubber. The copolymerization reaction can be carried out by any method, such as an emulsion polymerization method, a suspension polymerization method, a solution polymerization method, or a bulk polymerization method. Preferably, an emulsion polymerization method or a suspension polymerization method is used, and the reaction is carried out at a temperature of about −10 to 100° C., preferably about 5 to 80° C.

Examples of the polymerization initiator for the reaction include organic peroxides or hydroperoxides, such as benzoyl peroxide, dicumyl peroxide, tert-butyl hydroperoxide, cumyl hydroperoxide and p-methylene hydroperoxide; diazo compounds, such as azobisisobutyronitrile and azobisisobutylamidine; ammonium salts represented by ammonium persulfate; peroxide salts, such as sodium salts and potassium salts; and the like. These are used singly or as a redox system.

As an emulsifier used in the particularly preferable emulsion polymerization method, an anionic or nonionic surfactant is used as an aqueous solution or the like whose pH is optionally adjusted by acid or base, and which is formed into a buffer solution by using an inorganic salt.

The polymerization reaction is continued until the conversion rate of the monomer mixture reaches 90% or more. The obtained aqueous latex is coagulated by a salt-acid coagulation method, a method using a salt, such as calcium chloride, magnesium sulfate, sodium sulfate, or ammonium sulfate, a method using a boron compound, such as boric acid or borax, a coagulation method by heat, a freeze coagulation method, or the like. The obtained copolymer is sufficiently washed with water and dried. This acrylic rubber has Mooney viscosity $PML_{1+4}$ (100° C.) of about 5 to 100, preferably about 20 to 80.

A crosslinkable composition comprising the acrylic elastomer copolymer of the present invention as a main component can be preferably formed by adding a crosslinking accelerator, such as a guanidine compound, or a diazabicycloalkene compound or an organic acid salt thereof.

Examples of guanidine compound include tetramethylguanidine, tetraethylguanidine, 1,3-diphenylguanidine, 1,3-di-o-tolylguanidine, and the like; preferably 1,3-diphenylguanidine, 1,3-di-o-tolylguanidine, or a combination thereof.

The diazabicycloalkene compound or an organic acid salt thereof is preferably 1,8-diazabicyclo[5.4.0]-7-undecene or an organic acid salt thereof.

Examples of the organic acid used in the organic acid salt of 1,8-diazabicyclo[5.4.0]-7-undecane include organic monobasic acids or organic dibasic acids. Examples of organic monobasic acid include n-hexanoic acid, n-heptanoic acid, n-octanoic acid, 2-ethylhexanoic acid, n-capric acid, n-lauric acid, p-toluenesulfonic acid, phenol, and the like. Examples of organic dibasic acid include adipic acid, pimelic acid, suberic acid, azelaic acid, sebacic acid, undecanedioic acid, dodecanedioic acid, terephthalic acid, orthophthalic acid, phthalic acid, and the like. Preferable examples include monocarboxylic acids or dicarboxylic acids having 6 to 18 carbon atoms.

The above crosslinking accelerator is used at a ratio of about 0.1 to 5 parts by weight, preferably about 0.3 to 3 parts by weight, based on 100 parts by weight of the acrylic elastomer copolymer of the present invention. If the amount of the crosslinking accelerator is less than this range, the crosslinking rate may be significantly reduced, the mechanical properties of the acrylic elastomer after crosslinking may be reduced, and the mechanical properties after heat aging may be reduced. In contrast, if the crosslinking accelerator is used at a ratio greater than this range, the compression set characteristics of the acrylic elastomer may be deteriorated.

The acrylic elastomer copolymer of the present invention can form a crosslinkable composition without adding a crosslinking agent; however, in order to adjust the crosslinking rate or the mechanical strength of the crosslinked product, it is possible to further add a crosslinking agent.

As the crosslinking agent, an aliphatic polyvalent amine compound, a carbonate of an aliphatic polyvalent amine compound, an aliphatic polyvalent amine compound in which the amino group is protected with an organic group, or an aromatic polyvalent amine compound can be used.

Examples of aliphatic polyvalent amine compound include hexamethylenediamine. Further, examples of carbonates of aliphatic polyvalent amine compound include hexamethylenediamine carbamate. Examples of aliphatic polyvalent amine in which the amino group is protected with an organic group include N,N'-dicinnamylidene-1,6-hexanediamine or the compounds disclosed in Patent Document 11.

Examples of aromatic polyvalent amine compound include 4,4'-methylenedianiline, m-phenylenediamine, p-phenylenediamine, 4,4'-diaminodiphenylether, 4,4'-bis(4-aminophenoxy)biphenyl, m-xylylenediamine, p-xylylenediamine, 1,3,5-benzenetriamine, 4,4'-(m-phenylenediisopropylidene)dianiline, 4,4'-(p-phenylenediisopropylidene) dianiline, 2,2-bis[4-(4-aminophenoxy)phenyl]propane, 4,4'-diaminobenzanilide, and the like.

The polyvalent amine compounds mentioned above can be used singly or in combination of two or more. Preferably, hexamethylenediamine carbamate, 4,4'-diaminodiphenylether, and 2,2-bis[4-(4-aminophenoxy)phenyl]propane are used.

The amount of the above crosslinking agent added is suitably adjusted depending on the desired crosslinking rate, mechanical strength of the crosslinked product, and heat aging characteristics.

The crosslinkable composition comprising the acrylic elastomer copolymer of the present invention as a main component may be compounded with, if necessary, various additives, such as thermal antioxidants, fillers, processing aids, plasticizers, softeners, colorants, stabilizers, adhesion aids, mold release agents, conductivity imparting agents, thermal conductivity imparting agents, surface non-adhesives, tackifiers, flexibility imparting agents, heat resistance improving agents, flame retardants, UV absorbers, oil resistance improving agents, scorch retarders, and lubricants.

Examples of filler include silica, such as basic silica and acidic silica; metal oxides, such as zinc oxide, calcium oxide, titanium oxide, and aluminum oxide; metal hydroxides, such as magnesium hydroxide, aluminum hydroxide, and calcium hydroxide; metal carbonates, such as magnesium carbonate, aluminum carbonate, calcium carbonate, and barium carbonate; silicates, such as magnesium silicate, calcium silicate, sodium silicate, and aluminum silicate; sulfates, such as aluminum sulfate, calcium sulfate, and barium sulfate; metal sulfides, such as molybdenum disulfide, iron sulfide, and copper sulfide; synthetic hydrotalcite; diatomaceous earth, asbestos, lithopone (zinc sulfide/barium sulfide), graphite, carbon black (MT carbon black, SRF carbon black, FEF carbon black, etc.), fluorinated carbon, calcium fluoride, coke, quartz fine powder, zinc white, talc, mica powder, wollastonite, carbon fiber, aramid fiber, various whiskers, glass fiber, organic reinforcing agents, organic fillers, and the like.

Examples of processing aid include higher fatty acids, such as stearic acid, oleic acid, palmitic acid, and lauric acid; higher fatty acid salts, such as sodium stearate and zinc stearate; higher fatty acid amides, such as amide stearate and amide oleate; higher fatty acid esters, such as ethyl oleate; higher aliphatic amines, such as stearyl amine, oleyl amine; petroleum-based waxes, such as carnauba wax and ceresin wax; polyglycols, such as ethylene glycol, glycerol, and diethylene glycol; aliphatic hydrocarbons, such as vaseline and paraffin; silicone-based oils, silicone-based polymer, low-molecular-weight polyethylene, phthalic acid esters, phosphoric acid esters, rosin, (halogenated) dialkyl amine, (halogenated) dialkyl sulfone, surfactants, and the like.

Examples of plasticizer include epoxy resin, and derivatives of phthalic acid and sebacic acid. Examples of softener include lubricating oil, process oil, coal tar, castor oil, and calcium stearate. Examples of antioxidant include phenylenediamines, phosphates, quinolines, cresols, phenols, dithiocarbamate metal salts, and the like.

The crosslinkable composition comprising the acrylic elastomer copolymer of the present invention as a main component can be prepared by compounding the acrylic elastomer copolymer of the present invention with a crosslinking accelerator and other compounding agents that are optionally used, and mixing them using a Banbury mixer, a pressure kneader, an open roll, or the like. The crosslinking thereof is carried out by primary crosslinking at about 120 to 250° C. for about 1 to 60 minutes, and optionally oven crosslinking (secondary crosslinking) at about 120 to 200° C. for about 1 to 20 hours.

EXAMPLES

The following describes the present invention with reference to Examples.

Reference Example

Production of 9FMM (9FMM)

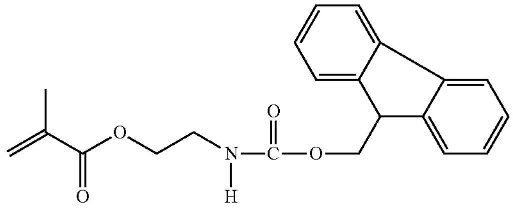

In a 500-ml four-necked flask equipped with a magnetic stirrer, a thermometer, a nitrogen gas inlet and outlet, and a reflux cooling tube, 14.7 g (75 mmol) of 9-fluorenylmethanol, 14.0 g (90 mmol) of 2-isocyanatoethyl methacrylate, 0.6 g of dibutyltin dilaurate, and 240 ml of benzene were placed and reacted in a nitrogen atmosphere at 80° C. for 2 hours.

After the reaction mixture was cooled to room temperature, 30 mg of para-methoxyphenol was added, and the benzene was then removed under the reduced pressure to obtain 31.2 g of a crude reaction product. The reaction product was recrystallized in 450 ml of ethanol, thereby obtaining 23.2 g (yield: 88%) of 9FMM as colorless crystals.

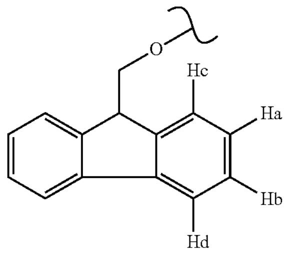

$^1$H-NMR (400 MHz, Acetone d6, δ ppm):
1.91 (s, 3H, $CH_2$═C($CH_3$)—C(═O)—O—)
3.47 (q, J=5.6 Hz, 2H, —O—$CH_2CH_2$—NH—C(C═O)—)
4.21 (t, J=5.6 Hz, 2H, —O—$CH_2CH_2$—NH—C(C═O)—)
4.23 (t, J=7.2 Hz, 1H, —C(═O)—$OCH_2$—CH—$Ar_2$)
4.35 (d, J=7.2 Hz, 2H, —C(═O)—$OCH_2$—CH—$Ar_2$)
5.62 (s, 1H, against the carbonyl group trans-$CH_2$═C($CH_3$)—C(═O)—O—)
6.10 (s, 1H, against the carbonyl group cis-$CH_2$═C($CH_3$)—C(═O)—O—)
6.73 (brs, 1H, —O—$CH_2CH_2$—NH—C(C═O)—
7.32 (t, J=7.6 Hz, 2H, Ar—Ha)
7.41 (t, J=7.6 Hz, 2H, Ar—Hb)
7.68 (d, J=7.6 Hz, 2H, Ar—Hc)
7.86 (d, J=7.6 Hz, 2H, Ar—Hd)

Example 1

In a separable flask equipped with a thermometer, a stirrer, a nitrogen gas inlet tube, and a Dimroth condenser tube, the following components were charged.

| | |
|---|---|
| Water | 187 parts by weight |
| Sodium lauryl sulfate | 2 parts by weight |
| Polyoxyethylene lauryl ether | 2 parts by weight |
| Charged monomer mixture | |
| Ethyl acrylate [EA] | 97.8 parts by weight |
| Mono n-butyl fumarate [MBF] | 0.8 parts by weight |
| 9FMM | 1.4 parts by weight |

After oxygen was sufficiently removed from the system by replacement with nitrogen gas, the following components were added.

| | |
|---|---|
| Sodium formaldehyde sulfoxylate (Rongalite, produced by FUJIFILM Wako Pure Chemical Corporation) | 0.008 parts by weight |
| Tertiary butyl hydroperoxide (Perbutyl H69, produced by NOF Corporation) | 0.0047 parts by weight |

Then, a polymerization reaction was initiated at room temperature, and the reaction was continued until the polymerization conversion rate reached 90% or more. The obtained aqueous latex was coagulated with a 10 wt. % sodium sulfate aqueous solution, followed by water washing and drying, thereby obtaining an acrylic elastomer copolymer A.

The Mooney viscosity $PML_{1+4}$ (100° C.) of the obtained acrylic elastomer copolymer A was 46. The molar fraction compositions of 9FMM and EA+MBF were 0.40 mol % and 99.60 mol % respectively, determined by $^1$-NMR (400 MHz, $CD_3C$(═O)$CD_3$, δ ppm) using the following formulas.

α: integral value of signal at 6.4-8.1 ppm
β: integral value of signal at 3.2-5.0 ppm $$9FMM\ (mol\ \%)=200\times\alpha/(9\beta-5\alpha)$$

$$EA+MBF\ (mol\ \%)=100-9FMM\ (mol\ \%)$$

Moreover, the approximate weight fraction compositions of 9FMM and EA+MBF were 1.4 wt % and 98.6 wt % respectively, determined by the following formulas.

$$9FMM\ (wt\ \%)=(9FMM\ (mol\ \%)\times351.4\times100)/[9FMM\ (mol\ \%)\times351.4+(EA+MBF\ (mol\ \%))\times100.5)]$$

$$EA+MBF\ (wt\ \%)=100-9FMM\ (wt\ \%)$$

Further, MBF (wt %) was 0.6 wt %, determined by measuring the acid value of the acrylic elastomer copolymer A.

Comparative Example 1

In Example 1, the following charged monomer mixture was used to obtain an acrylic elastomer copolymer B.
Charged Monomer Mixture

| | |
|---|---|
| Ethyl acrylate [EA] | 98.4 parts by weight |
| Mono n-butyl fumarate [MBF] | 1.6 parts by weight |

The Mooney viscosity $PML_{1+4}$ (100° C.) of the obtained acrylic elastomer copolymer B was 32. Further, MBF (wt %) was 1.2 wt %, determined by measuring the acid value of the acrylic elastomer copolymer B.

Example 2

In Example 1, the following charged monomer mixture was used to obtain an acrylic elastomer copolymer C.
Charged Monomer Mixture

| | |
|---|---|
| Ethyl acrylate [EA] | 57.8 parts by weight |
| n-butyl acrylate [BA] | 40.0 parts by weight |
| Mono n-butyl fumarate [MBF] | 0.8 parts by weight |
| 9FMM | 1.4 parts by weight |

The Mooney viscosity $PML_{1+4}$ (100° C.) of the obtained acrylic elastomer copolymer C was 33. Further, MBF (wt %) was 0.6 wt %, determined by measuring the acid value of the acrylic elastomer copolymer C. The molar fraction compositions of 9FMM and EA+BA+MBF were 0.43 mol % and 99.57 mol % respectively, determined by $^1$H-NMR (400 MHz, $CD_3C$(═O)$CD_3$, δ ppm) using the following formulas.

α: integral value of signal at 6.4-8.1 ppm
α: integral value of signal at 3.2-5.0 ppm $$9FMM\ (mol\ \%)=200\times\alpha/(9\beta-5\alpha)$$

$$EA+BA+MBF\ (mol\ \%)=100-9FMM\ (mol\ \%)$$

Moreover, the approximate weight fraction compositions of 9FMM and EA+BA+MBF were 1.4 wt % and 98.6 wt %, respectively, determined by the following formulas.

9FMM (wt %)=(9FMM (mol %)×351.4×100)/[9FMM (mol %)×351.4+(EA+BA+MBF (mol %))×110.3)]

EA+BA+MBF (wt %)=100−9FMM (wt %)

Comparative Example 2

In Example 1, the following charged monomer mixture was used to obtain an acrylic elastomer copolymer D.

| | |
|---|---|
| Ethyl acrylate [EA] | 58.4 parts by weight |
| n-butyl acrylate [BA] | 40.0 parts by weight |
| Mono n-butyl fumarate [MBF] | 1.6 parts by weight |

The Mooney viscosity $PML_{1+}4$ (100° C.) of the obtained acrylic elastomer copolymer D was 24. Further, MBF (wt %) was 1.2 wt %, determined by measuring the acid value of the acrylic elastomer copolymer D.

Example 3

In Example 1, the following charged monomer mixture was used to obtain an acrylic elastomer copolymer E.

| | |
|---|---|
| Ethyl acrylate [EA] | 52.8 parts by weight |
| n-butyl acrylate [BA] | 40.0 parts by weight |
| Methyl methacrylate [MMA] | 5.0 parts by weight |
| Mono n-butyl fumarate [MBF] | 0.8 parts by weight |
| 9FMM | 1.4 parts by weight |

The Mooney viscosity $PML_{1+4}$ (100° C.) of the obtained acrylic elastomer copolymer E was 40. Further, MBF (wt %) was 0.6 wt %, determined by measuring the acid value of the acrylic elastomer copolymer E.

The molar fraction compositions of 9FMM and EA+BA+MMA+MBF were 0.44 mol % and 99.56 mol %, respectively, determined by $^1$H-NMR (400 MHz, $CD_3C(=O)CD_3$, δ ppm) using the following formulas.

α: integral value of signal at 6.4-8.1 ppm

β: value reduced γ from integral value of signal at 3.2-5.0 ppm

γ: integral value of signal at 3.4-3.6 ppm

9FMM (mol %)=600×α/(27β−13α+18γ)

EA+BA+MMA+MBF (mol %)=100−9FMM (mol %)

Moreover, the approximate weight fraction compositions of 9FMM and EA+BA+MMA+MBF were 1.4 wt % and 98.6 wt %, respectively, determined by the following formulas.

9FMM (wt %)=(9FMM (mol %)×351.4×100)/[9FMM (mol %)×351.4+(EA+BA+MMA+MBF (mol %))×110.3)]

EA+BA+MMA+MBF (wt %)=100−9FMM (wt %)

Comparative Example 3

In Example 1, the following charged monomer mixture was used to obtain an acrylic elastomer copolymer F.

| | |
|---|---|
| Ethyl acrylate [EA] | 53.4 parts by weight |
| n-butyl acrylate [BA] | 40.0 parts by weight |
| Methyl methacrylate [MMA] | 5.0 parts by weight |
| Mono n-butyl fumarate [MBF] | 1.6 parts by weight |

The Mooney viscosity $PML_{1+4}$ (100° C.) of the obtained acrylic elastomer copolymer F was 31. Further, MBF (wt %) was 1.2 wt %, determined by measuring the acid value of the acrylic elastomer copolymer F.

Example 4

| | |
|---|---|
| Acrylic elastomer copolymer A | 100 parts by weight |
| FEF carbon black (Seast GSO, produced by Tokai Carbon Co., Ltd.) | 60 parts by weight |
| Stearic acid (TST, produced by Miyoshi Oil & Fat Co., Ltd.) | 1 part by weight |
| Polyoxyethylene stearyl ether phosphate (Phosphanol RL-210, produced by Toho Chemical Industry Co., Ltd.) | 0.5 parts by weight |
| Crosslinking accelerator (Vulcofac ACT55, produced by Safic-Alcan) | 1 parts by weight |
| 4,4'-Bis(α,α-dimethylbenzyl)diphenylamine (Nocrac CD, produced by Ouchi Shinko Chemical Industrial Co., Ltd.) | 2 parts by weight |

Among the above components, the acrylic elastomer copolymer A, FEF carbon black, stearic acid, and polyoxyethylene stearyl ether phosphate were mixed with a Banbury mixer. The obtained mixture and the other components were mixed using an open roll, thereby obtaining an acrylic elastomer copolymer composition.

The obtained composition was subjected to primary crosslinking at 180° C. for 8 minutes using a 100-ton press molding machine to obtain a sheet-like crosslinked product (non-post cured sheet) having a thickness of about 2 mm. Further, oven crosslinking was carried out at 175° C. for 4 hours to obtain a sheet-like crosslinked product (post cured sheet) having a thickness of about 2 mm.

The crosslinking characteristics of the acrylic elastomer copolymer composition and the physical properties of its crosslinked product were measured in the following manner.

Mooney scorch test: according to JIS K6300-1 corresponding to ISO 289-1 (125° C.). Using a Mooney viscometer (AM-3, produced by Toyo Seiki Seisaku-sho, Ltd.), the minimum Mooney viscosity (ML min) and scorch time (t5) values were measured.

Crosslinking test: according to JIS K6300-2 corresponding to ISO 6502 (180° C., 12 minutes). Using a rotorless rheometer (RLR-3, produced by Toyo Seiki Seisaku-sho, Ltd.), ML, MH, tc (10), and tc (90) values were measured.

ML: minimum torque

MH: maximum torque tc (10): time required for the crosslinking torque to reach ML+(MH−ML)×0.1 tc (90): time required for the crosslinking torque to reach ML+(MH−ML)×0.9

Normal state physical properties: measured according to JIS K6251 corresponding to ISO 37 and JIS K6253 corresponding to ISO 7619-1 for each of the non-post cured sheet and the post cured sheet Air heating aging test: measured according to JIS K6257 corresponding to ISO 188 for the post cured sheet (test temperatures: 175° C. and 190° C.)

Comparative Example 4

In Example 4, the acrylic elastomer copolymer B was used in place of the acrylic elastomer copolymer A, and 0.6 parts by weight of hexamethylenediamine carbamate (Cheminox AC6F, produced by Unimatec Co., Ltd.) was further added.

Example 5

In Example 4, the acrylic elastomer copolymer C was used in place of the acrylic elastomer copolymer A.

Comparative Example 5

In Example 4, the acrylic elastomer copolymer D was used in place of the acrylic elastomer copolymer A, and 0.6 parts by weight of hexamethylenediamine carbamate (Cheminox AC6F, produced by Unimatec Co., Ltd.) was further added.

Example 6

In Example 4, the acrylic elastomer copolymer E was used in place of the acrylic elastomer copolymer A.

Comparative Example 6

In Example 4, the acrylic elastomer copolymer F was used in place of the acrylic elastomer copolymer A, and 0.6 parts by weight of hexamethylenediamine carbamate (Cheminox AC6F, produced by Unimatec Co., Ltd.) was further added.

Following Tables 1 to 3 and FIGS. 1 to 15 shows the results obtained in the above Examples 4 to 6 and Comparative Examples 4 to 6.

TABLE 1

| Measurement result | | Example 4 | Comparative Example 4 |
|---|---|---|---|
| Mooney scorch test (125° C.) | | | |
| ML min | (pts) | 70 | 66 |
| t5 | (min) | 3.7 | 3.1 |
| Crosslinking test (180° C.) | | | |
| tc (10) | (min) | 0.53 | 0.48 |
| tc (90) | (min) | 5.73 | 5.03 |
| ML | (N · m) | 0.25 | 0.31 |
| MH | (N · m) | 0.93 | 1.13 |
| Normal state physical properties (non-post cured) | | | |
| Hardnes | (Duro A) | 60 | 62 |
| 100% modulus | (MPa) | 5.4 | 4.8 |
| Breaking strength | (MPa) | 16.1 | 14.6 |
| Elongation at break | (%) | 260 | 280 |
| Normal state physical properties (post cured) | | | |
| Hardness | (Duro A) | 64 | 69 |
| 100% modulus | (MPa) | 6.6 | 6.5 |
| Breaking strength | (MPa) | 16.3 | 16.9 |
| Elongation at break | (%) | 210 | 230 |
| Air heating aging test (190° C., 168 hours) | | | |
| Hardness change | (Duro A) | +11 | +8 |
| 100% modulus change rate | (%) | −29 | −46 |
| Breaking strength change rate | (%) | −35 | −54 |
| Elongation at break change rate | (%) | +11 | +39 |

TABLE 1-continued

| Measurement result | | Example 4 | Comparative Example 4 |
|---|---|---|---|
| Air heating aging test (190° C., 288 hours) | | | |
| Hardness change | (Duro A) | +14 | +9 |
| 100% modulus change rate | (%) | −39 | −54 |
| Breaking strength change rate | (%) | −57 | −73 |
| Elongation at break change rate | (%) | +13 | +39 |
| Air heating aging test (190° C., 376 hours) | | | |
| Hardness change | (Duro A) | +21 | +17 |
| 100% modulus change rate | (%) | −23 | −29 |
| Breaking strength change rate | (%) | −61 | −71 |
| Elongation at break change rate | (%) | −19 | −26 |
| Air heating aging test (190° C., 500 hours) | | | |
| Hardness change | (Duro A) | +31 | +32 |
| 100% modulus change rate | (%) | — | — |
| Breaking strength change rate | (%) | −42 | −38 |
| Elongation at break change rate | (%) | −84 | −87 |
| Air heating aging test (175° C., 70 hours) | | | |
| Hardness change | (Duro A) | +7 | +2 |
| 100% modulus change rate | (%) | +3 | −21 |
| Breaking strength change rate | (%) | −8 | −22 |
| Elongation at break change rate | (%) | −2 | +16 |
| Air heating aging test (175° C., 250 hours) | | | |
| Hardness change | (Duro A) | +7 | +3 |
| 100% modulus change rate | (%) | −17 | −45 |
| Breaking strength change rate | (%) | −24 | −46 |
| Elongation at break change rate | (%) | +13 | +35 |
| Air heating aging test (175° C., 500 hours) | | | |
| Hardness change | (Duro A) | +9 | +6 |
| 100% modulus change rate | (%) | −30 | −52 |
| Breaking strength change rate | (%) | −42 | −63 |
| Elongation at break change rate | (%) | +17 | +55 |
| Air heating aging test (175° C., 750 hours) | | | |
| Hardness change | (Duro A) | +17 | +12 |
| 100% modulus change rate | (%) | −30 | −48 |
| Breaking strength change rate | (%) | −55 | −72 |
| Elongation at break change rate | (%) | +18 | +32 |
| Air heating aging test (175° C., 1000 hours) | | | |
| Hardness change | (Duro A) | +25 | +20 |
| 100% modulus change rate | (%) | −5 | −18 |
| Breaking strength change rate | (%) | −56 | −69 |
| Elongation at break change rate | (%) | −17 | −22 |

TABLE 2

| Measurement results | | Example 5 | Comparative Example 5 |
|---|---|---|---|
| Mooney scorch test (125° C.) | | | |
| ML min | (pts) | 57 | 50 |
| t5 | (min) | 3.3 | 3.0 |
| Crosslinking test (180° C.) | | | |
| tc (10) | (min) | 0.58 | 0.51 |
| tc (90) | (min) | 6.18 | 5.83 |
| ML | (N · m) | 0.21 | 0.23 |
| MH | (N · m) | 0.78 | 0.89 |
| Normal state physical properties (post cured) | | | |
| Hardness | (Duro A) | 62 | 62 |
| 100% modulus | (MPa) | 7.4 | 4.8 |
| Breaking strength | (MPa) | 13.0 | 13.6 |
| Elongation at break | (%) | 160 | 210 |
| Air heating aging test (190° C., 100 hours) | | | |
| Hardness change | (Duro A) | +5 | +1 |
| 100% modulus change rate | (%) | −19 | −46 |
| Breaking strength change rate | (%) | −15 | −38 |
| Elongation at break change rate | (%) | +15 | +40 |
| Air heating aging test (190° C., 200 hours) | | | |
| Hardness change | (Duro A) | +7 | +6 |
| 100% modulus change rate | (%) | −28 | −50 |
| Breaking strength change rate | (%) | −28 | −54 |
| Elongation at break change rate | (%) | +11 | +34 |
| Air heating aging test (190° C., 300 hours) | | | |
| Hardness change | (Duro A) | +12 | +13 |
| 100% modulus change rate | (%) | −26 | −38 |
| Breaking strength change rate | (%) | −34 | −57 |
| Elongation at break change rate | (%) | +4 | +7 |
| Air heating aging test (190° C., 400 hours) | | | |
| Hardness change | (Duro A) | +19 | +17 |
| 100% modulus change rate | (%) | +0 | +6 |
| Breaking strength change rate | (%) | −34 | −55 |
| Elongation at break change rate | (%) | −23 | −38 |
| Air heating aging test (190° C., 500 hours) | | | |
| Hardness change | (Duro A) | +25 | +23 |
| 100% modulus change rate | (%) | — | — |
| Breaking strength change rate | (%) | −33 | −43 |
| Elongation at break change rate | (%) | −51 | −59 |
| Air heating aging test (175° C., 250 hours) | | | |
| Hardness change | (Duro A) | +6 | −3 |
| 100% modulus change rate | (%) | −22 | −46 |
| Breaking strength change rate | (%) | −16 | −39 |
| Elongation at break change rate | (%) | +10 | +32 |
| Air heating aging test (175° C., 500 hours) | | | |
| Hardness change | (Duro A) | +2 | +0 |
| 100% modulus change rate | (%) | −34 | −48 |
| Breaking strength change rate | (%) | −31 | −54 |
| Elongation at break change rate | (%) | +14 | +22 |
| Air heating aging test (175° C., 750 hours) | | | |
| Hardness change | (Duro A) | +12 | +10 |
| 100% modulus change rate | (%) | −26 | −38 |
| Breaking strength change rate | (%) | −32 | −54 |
| Elongation at break change rate | (%) | +9 | +17 |
| Air heating aging test (175° C., 1000 hours) | | | |
| Hardness change | (Duro A) | +22 | +21 |
| 100% modulus change rate | (%) | +5 | +15 |
| Breaking strength change rate | (%) | −29 | −52 |
| Elongation at break change rate | (%) | −20 | −38 |

TABLE 3

| Measurement results | | Example 6 | Comparative Example 6 |
|---|---|---|---|
| Mooney scorch test (125° C.) | | | |
| ML min | (pts) | 57 | 56 |
| t5 | (min) | 3.0 | 3.2 |
| Crosslinking test (180° C.) | | | |
| tc (10) | (min) | 0.58 | 0.53 |
| tc (90) | (min) | 6.40 | 6.02 |
| ML | (N · m) | 0.21 | 0.23 |
| MH | (N · m) | 0.80 | 0.87 |
| Normal state physical properties (post cured) | | | |
| Hardness | (Duro A) | 63 | 65 |
| 100% modulus | (MPa) | 7.5 | 4.4 |
| Breaking strength | (MPa) | 14.3 | 13.1 |
| Elongation at break | (%) | 180 | 230 |
| Air heating aging test (190° C., 100 hours) | | | |
| Hardness change | (Duro A) | +6 | +1 |
| 100% modulus change rate | (%) | −20 | −39 |
| Breaking strength change rate | (%) | −22 | −37 |
| Elongation at break change rate | (%) | +5 | +34 |
| Air heating aging test (190° C., 200 hours) | | | |
| Hardness change | (Duro A) | +9 | −2 |
| 100% modulus change rate | (%) | −32 | −45 |
| Breaking strength change rate | (%) | −34 | −53 |
| Elongation at break change rate | (%) | +8 | +35 |
| Air heating aging test (190° C., 300 hours) | | | |
| Hardness change | (Duro A) | +14 | +11 |
| 100% modulus change rate | (%) | −33 | −41 |
| Breaking strength change rate | (%) | −45 | −64 |
| Elongation at break change rate | (%) | +2 | +22 |

TABLE 3-continued

| Measurement results | | Example 6 | Comparative Example 6 |
|---|---|---|---|
| Air heating aging test (190° C., 400 hours) | | | |
| Hardness change | (Duro A) | +16 | +14 |
| 100% modulus change rate | (%) | −23 | −22 |
| Breaking strength change rate | (%) | −45 | −60 |
| Elongation at break change rate | (%) | −15 | −6 |
| Air heating aging test (190° C., 500 hours) | | | |
| Hardness change | (Duro A) | +22 | +20 |
| 100% modulus change rate | (%) | +1 | +17 |
| Breaking strength change rate | (%) | −42 | −53 |
| Elongation at break change rate | (%) | −37 | −38 |

The invention claimed is:

1. A crosslinkable composition comprising 0.1 to 5 parts by weight of a crosslinking accelerator, based on 100 parts by weight of an acrylic elastomer copolymer, wherein the acrylic elastomer copolymer is being a copolymer of:

(A) 90 to 99.8 wt % of an alkyl (meth)acrylate and/or alkoxyalkyl (meth)acrylate monomer, (B) 0.1 to 5 wt % of an α,β-unsaturated carboxylic acid monomer, and (C) 0.1 to 5 wt % of a (meth)acrylate monomer having a carbamic acid ester group represented by the general formula:

(I)

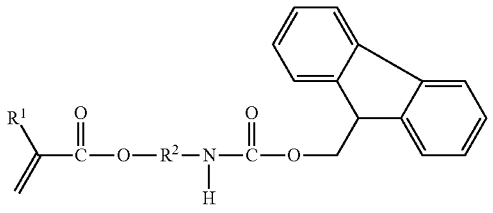

where $R^1$ is a hydrogen atom or a methyl group, and $R^2$ is a divalent aliphatic hydrocarbon group having 1 to 10 carbon atoms.

2. The crosslinkable composition according to claim 1, wherein the crosslinking accelerator is 1,8-diazabicyclo [5.4.0]-7-undecene or an organic acid salt thereof, 1,3-diphenylguanidine, or 1,3-di-o-tolylguanidine.

* * * * *